US006996083B1

(12) United States Patent  
Balachandran et al.

(10) Patent No.: US 6,996,083 B1  
(45) Date of Patent: Feb. 7, 2006

(54) BURST BASED ACCESS AND ASSIGNMENT METHOD FOR PROVIDING REAL-TIME SERVICES

(75) Inventors: Krishna Balachandran, Middletown, NJ (US); Sanjiv Nanda, Clarksburg, NJ (US); Konstantinos Samaras, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 783 days.

(21) Appl. No.: 09/650,792

(22) Filed: Aug. 30, 2000

Related U.S. Application Data

(60) Provisional application No. 60/170,247, filed on Dec. 10, 1999.

(51) Int. Cl.  
*H04J 3/00* (2006.01)  
*H04B 7/212* (2006.01)

(52) U.S. Cl. ..................... 370/337; 370/347

(58) Field of Classification Search ........ 370/347–348, 370/458, 431, 442, 310, 345, 468, 498, 337  
See application file for complete search history.

(56) References Cited

U.S. PATENT DOCUMENTS

| | | | | |
|---|---|---|---|---|
| 5,515,379 A | * | 5/1996 | Crisler et al. | 370/347 |
| 5,594,738 A | * | 1/1997 | Crisler et al. | 370/347 |
| 5,648,967 A | | 7/1997 | Schulz | 370/328 |
| 6,327,256 B1 | * | 12/2001 | Paivike et al. | 370/337 |
| 6,614,778 B1 | * | 9/2003 | Hwang | 370/348 |
| 6,704,932 B1 | * | 3/2004 | Matsunaga et al. | 725/126 |
| 6,771,663 B1 | * | 8/2004 | Jha | 370/473 |
| 6,792,001 B1 | * | 9/2004 | Rosengren | 370/474 |

FOREIGN PATENT DOCUMENTS

| | | |
|---|---|---|
| EP | 0 681 406 A1 | 5/1995 |
| EP | 0 687 078 A2 | 6/1995 |

\* cited by examiner

*Primary Examiner*—Chi Pham  
*Assistant Examiner*—Blanche Wong

(57) ABSTRACT

A method and system for reducing delay in wireless communications by use of a burst based access and assignment system. The method for setting up a communication channel uses short burst(s) (essentially a slot of a time frame). Time is saved by keeping the uplink and downlink channels flexible and independent of each other. Thus less time is used trying to fit all requests and responses into constrained choices as in previous protocols. The result is less delay to the mobile user and greater usage density for the wireless service provider.

8 Claims, 12 Drawing Sheets

| RT TBF STATE | TRAFFIC ACTIVITY | | TCH CHANNEL ASSIGNMENT | | CONTROL CHANNEL ASSIGNMENT | |
|---|---|---|---|---|---|---|
| | UL | DL | UL | DL | UL | DL |
| TBF Inactive | idle | idle | | | FRACH FACKCH UPRCH UBMCH | FASSCH DPRCH DBMCH |
| UL Active | active | idle | UTCH/ (B)FACCH/ MSACCH | | FRACH FACKCH UBMCH | FASSCH DPRCH DBMCH |
| DL Active | idle | active | | DTCH/ (B)FACCH/ MSACCH | FRACH FACKCH UPRCH UBMCH | FASSCH DBMCH |
| UL + DL Active | active | active | UTCH/ (B)FACCH/ MSACCH | DTCH/ (B)FACCH/ MSACCH | FRACH FACKCH UBMCH | FASSCH DBMCH |

*FIG. 5*

| PROCEDURES | RT TBF STATE | | | |
|---|---|---|---|---|
| | Inactive | UL Active | DL Active | DL + UL Active |
| Reassign DL Control (RDC) | X | X | | |
| Reassign UL Control (RUC) | X | | X | |
| Start DL Traffic (SDT) | X | X | | |
| End DL Traffic (EDT) | | | X | X |
| Reassign DL Traffic (RDT) | | | X | X |
| Start UL Traffic (SUT) | X | | X | |
| End UL Traffic (EUT) | | X | | X |
| Reassign UL Traffic (RUT) | | X | | X |
| End TBF (ET) | X | X | X | X |
| Start New TBF (ST) | X | X | X | X |

*FIG. 6*

| MESSAGE | CHANNEL DURING UPLINK TRAFFIC | CHANNEL WITH NO UPLINK TRAFFIC |
|---|---|---|
| Access Request | BFACCH | FRACH |
| Acknowledge to Assignment | BFACCH | FACKCH |
| AMR Mode Request | UTCH | UPRCH |
| SID Update | N/A | UPRCH |
| Neighbor Measurement Report | MSACCH | UPRCH |
| RLC Signaling | UTCH | UBMCH |
| End TBF Request | BFACCH | FRACH |

FIG. 7

| MESSAGE | CHANNEL DURING DOWNLINK TRAFFIC | CHANNEL WITH NO DOWNLINK TRAFFIC |
|---|---|---|
| Assignment (all) | BFACCH | FASSCH |
| AMR Mode Command | DTCH | DPRCH |
| SID Update | N/A | DPRCH |
| Handover Directives | FACCH | DBMCH |
| RLC Signaling | DTCH | DBMCH |
| Timing Advance | MSACCH | DPRCH |
| Power Control | MSACCH | DPRCH |
| End TBF Command | BFACCH | FASSCH |

FIG. 8

| DOWNLINK BURST MESSAGE | INFORMATION ELEMENTS |
|---|---|
| Assign UTCH | ARI, DMT, TBFI, CID, CTS, PH, SD |
| Deferred Assign UTCH | ARI, DMT, TBFI, RRBP, delay |
| Assign DTCH | ARI, DMT, TBFI, RRBP, CID, CTS, PH, SD |
| Assign UPRCH | ARI, DMT, RRBP, CID, CTS, OFF |
| Assign DPRCH | ARI, DMT, RRBP, CID, CTS, OFF |
| Assign FRACH | ARI, DMT, RRBP, CID, CTS, PH |
| Assign FACKCH | ARI, DMT, RRBP, CID, CTS, PH |
| Assign FASSCH | ARI, DMT, RRBP, CID, CTS, PH |
| End TBF Command | ARI, DMT, TBFI, RRBP, reason |

*FIG. 9*

| UPLINK BURST MESSAGE | INFORMATION ELEMENTS |
|---|---|
| Access Request | ARI, UMT, TBFI |
| Acknowledge UTCH | ARI, UMT, TBFI |
| Acknowledge DTCH | ARI, UMT, TBFI |
| Acknowledge UPRCH | ARI, UMT, TBFI |
| Acknowledge DPRCH | ARI, UMT, TBFI |
| Acknowledge FRACH | ARI, UMT, TBFI |
| Acknowledge FACKCH | ARI, UMT, TBFI |
| Acknowledge FASSCH | ARI, UMT, TBFI |
| Acknowledge End TBF | ARI, UMT, TBFI |
| End TBF Request | ARI, UMT, TBFI, reason |

*FIG. 10*

*VARIATION: Deferred Assign UT

BURST BASED ACCESS AND ASSIGNMENT METHOD FOR PROVIDING REAL-TIME SERVICES

CROSS-REFERENCE TO RELATED APPLICATIONS

This application claims priority of Provisional Application Ser. No. 60/170,247, which was filed Dec. 10, 1999.

This application is related to co-pending Balachandran 13-18-1840-1 entitled A SYSTEM FOR STATISTICALLY MULTIPLEXING REAL-TIME AND NON-REAL-TIME VOICE AND DATA TRAFFIC IN A WIRELESS SYSTEM, which is hereby incorporated by reference.

TECHNICAL FIELD

The invention relates to relates generally to wireless communication networks and, more particularly, to a method for efficiently providing voice communications over wireless and/or cellular networks.

Description of the Prior Art

The widespread growing popularity of the Internet has encouraged wireless communication system developers to continually improve the data communication capabilities of their systems. In response to this need, various standards bodies have formulated and continue to formulate new third generation (3G) standards which support higher data rates. For example, standards organizations such as the European Telecommunications Standards Institute (ETSI), the Association of Radio Industries and Broadcasting (ARIB) and the Telecommunications Industry Association (TIA) are continually developing standards to support faster and more efficient wireless communications.

Similarly, the wireless communications industry is often developing and implementing new wireless transmission protocols which provide faster, more robust and more efficient data communications over air interfaces. For example, GSM continues to evolve. In another example, general packet radio service (GPRS) has been developed as a packet-switched upgrade for the well known time division multiple access (TDMA) system. In a further advancement in the art, enhanced GPRS (EGPRS) has also been developed.

Presently, GSM, GPRS and EGPRS physical layers have the following characteristics: a carrier that consists of two 200 kHz bandwidth segments of the allocated GSM spectrum, 45 MHz apart, one for the downlink and one for the uplink; time is divided into frames with a multiframe comprising 52 frames and spans 240 msec.; each frame consists of 8 time slots; one slot on one carrier is referred to as a GSM channel; there is a one-to-one correspondence between a slot (numbered j, j=0, . . . 7) on a downlink carrier at frequency (f) and an uplink slot (numbered j) on the corresponding uplink carrier (f+45 MHz); a transmission in a slot is referred to as a burst; and a block consists of a predefined set of four bursts on the same slot.

Radio access bearers are currently being designed in order to provide real time services in EGPRS Phase II. However, recent approaches rely on using the existing burst based random access channels on the uplink and block based assignment channels on the downlink. Each block is interleaved and transmitted over 4 bursts (20 msec). However, investigation has shown systems based on 20 msec granularity require at least a 60 msec delay budget. Also, the investigation has shown transmission of assignments to multiple mobile stations within a single 20 msec message often is inefficient due to low packing and is incompatible with interference reduction techniques such as smart antennas and power control. As a result, block based assignment channels according to the recent approaches can result in excessive control overhead and excessive delays for statistical multiplexing of real time transfers (e.g. voice talkspurts). It is desirable to provide a better access and assignment system and method.

In order to efficiently use the high capacity of a wireless or a cellular data telecommunication system (e.g., GPRS or EGPRS), it is also desirable to provide voice and data multiplexing capability as well as statistical multiplexing of voice users. Currently these cellular data telecommunication systems are designed to provide primarily non-real time (delay insensitive) data services. Conversational speech and other real time interactive communications are delay sensitive and require the design of new control mechanisms to provide fast control channels to meet the critical delay requirements. Therefore, there is a need to redesign wireless data telecommunication systems to provide such control capabilities to make them suitable for multiplexing both non-real-time services and real-time services, such as conversational speech.

SUMMARY OF THE INVENTION

The need for voice is met by the method of the present invention wherein methods are described that enable efficient and flexible multiplexing of both real-time and non-real-time services over the wireless data telecommunication system.

Briefly stated in accordance with one aspect of the invention, the aforementioned problems are addressed and an advance in the art achieved by providing a burst based access and assignment (BBAA) system and method in order to facilitate fast allocation and de-allocation of traffic and control channels to both real-time users and non-real-time (nRT) users that are sharing the same wireless data communication resources. Additionally, the BBAA system and method overcomes the some of the previously known problems by breaking the correspondence between downlink and uplink carriers, and downlink and uplink slots, also known as bursts.

In accordance with one aspect of the invention, the aforementioned problems are addressed and an advance in the art achieved by providing a method for communicating over a wireless time division multiplexed communications system in which time is divided into a plurality of frames and each frame is divided into N data bursts, said method comprising the steps of: assigning a series of data bursts that occur periodically every N bursts and occur once per frame to a plurality of channels; transmitting a non-channel asssignment message on a first of said plurality of channels that is over a data block that includes more than one consecutive data burst; and transmitting a channel assignment message using a single data burst.

In accordance with another aspect of the invention, the aforementioned problems are addressed by the method described above, further including the step of transmitting a request message that identifies the accessing station a single data burst.

In accordance with another aspect of the invention, the aforementioned problems are addressed by the method described above, further including the step of transmitting the channel assignment message in response to the request message.

In accordance with another aspect of the invention, the aforementioned problems are addressed by the method described above, further including the step of repeating the transmitting of the request message in the absence of a response message.

In accordance with another aspect of the invention, the aforementioned problems are addressed by the method described above, further including the step of repeating the channel assignment message in response to the request message.

In accordance with another aspect of the invention, the aforementioned problems are addressed by a system that implements the methods above.

BRIEF DESCRIPTION OF THE DRAWING

FIG. 5 illustrates a state table that is another way of presenting the information of FIG. 4.

FIG. 6 illustrates a RT TBF State Diagram in table form.

FIG. 7 illustrates message and uplink interaction in tabular form.

FIG. 8 illustrates a summary of downlink signaling and control messages in tabular form.

FIG. 9 illustrates downlink burst message content in tabular form.

FIG. 10 illustrates uplink burst message content in tabular form.

DETAILED DESCRIPTION

Figure 1:
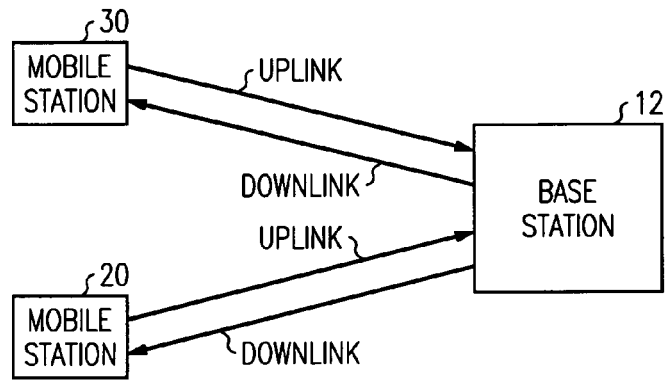
FIG. 1 is a block diagram of a mobile station receiver-transmitter and a GERAN base station receiver-transmitter.

Referring now to FIG. 1, a new wireless network 1 is shown. In a preferred embodiment, the wireless network 1 is a GSM Enhanced-General-Packet-Radio-Service Radio Access Network (GERAN) as described herein. GERAN 1 has a base station 12 which has a transmitter, a receiver and an antenna (not shown) as a base station typically has. Base station 12 is part of the GERAN 1. GERAN 1 is used to communicate with and carry message traffic between callers of all kinds and mobile stations, such as mobile stations 20, 30. The present invention provides new traffic and control channels that are completely compatible with beam forming and power control techniques, enabling their use for all new traffic and control channels. This result is achieved by designing all communication on these channels to be point-to-point. There are no multicast or broadcast control messages or control fields in any downlink transmissions.

The present invention has unidirectional traffic and control channels. The benefits of statistical multiplexing are achieved through the application of the following principles. All new control and traffic channels are unidirectional, with independent frequency and slot allocation in the uplink and downlink directions. Available resources can be dynamically allocated as necessary to traffic and control channel functions. This allows for maximum flexibility in allocation of available resources.

In previously known GSM, GPRS and EGPRS Phase 1, a channel consists of one time slot on a 200 kHz carrier at frequency f for the downlink and a corresponding slot on a 200 kHz carrier at (f+45 MHz) on the uplink. Breaking this historical association between uplink and downlink channels allows for statistical multiplexing of speech, in particular, since the uplink and downlink resource demands occur independently. Breaking the historical association between uplink and downlink maximizes the resource pool available for assignment when new data or speech becomes available for transmission.

A primary consideration for any GERAN method and system must be the impact on half-duplex mobiles, given their cost advantages. (Half duplex mobiles in TDMA systems transmit and receive in different time slots and therefore do not require a duplexer). In the previous GSM, GPRS and EGPRS Phase 1, corresponding time slots on the uplink and downlink were chosen in such a way that they were compatible with half-duplex operation. With statistical multiplexing, the system can be specifically design for maximum flexibility of operation with half duplex mobiles, when both the uplink and downlink time slots are dynamically assigned The new control and traffic channels are designed to support half-duplex mobiles in a manner that maximizes the pool of traffic and control channel resources available for assignment to these mobiles.

In what follows, a Burst Based Access and Assignment (BBAA) method and system that facilitate fast allocation and de-allocation of traffic and control channels to real time users, as well as to non real time (nRT) users sharing the same resources.

Taking voice as a representative example, whenever a talkspurt is generated, the mobile station (MS) sends an access request message. This single-burst message contains a field called ARI (Access Request Identifier) which uniquely identifies the MS. If the uplink access message is successfully received by the base station, an acknowledgement message (also single burst based) is sent to the MS. Uplink and downlink transmissions are completed within 5 msec. This is the best case, assuming minimal processing delays. Comparing this with a four burst based assignment technique which requires at least 40 msec for uplink/downlink transmission it is easy to realize the potential access delay reduction. Such a delay reduction is crucial for RT services like voice. Even in the case where the uplink access message is corrupted (by errors or by collisions) or the downlink message is corrupted, the MS is able to repeat the whole process in the next 5 msec period. This finer granularity, which leads to shorter time periods, is the main advantage of the single burst based method and system. This fact is demonstrated by comparing the performance of the present invention with a technique based on a 20 msec downlink granularity (using block-based assignments).

Simulations show that it is possible to support more than 60 simultaneous voice calls on a single burst based access and assignment channel under a 40 msec delay constraint (with an access failure probability of less than 1%). Schemes based on 20 msec granularity require at least a 60 msec delay budget. Simulation results show that the present invention's burst based access and assignment technique offers a significant performance advantage with a shorter delay budget. Moreover, the burst based access and assignment (BBAA) channels may be deployed efficiently with aggressive reuse, smart antennas and power control. Such deployments are not suitable for 20 msec block based assignments to multiple users.

Note that the high error rate of burst assignments on the downlink is the primary reason that this scheme may be considered unsuitable, simulation studies show that the shorter delays mean that multiple access assignment cycles can be completed within the same period as a block based scheme. This results in the burst based access and assignment scheme having higher reliability with shorter delays and higher capacity.

Application of BBAA to GERAN

GERAN document 2E99-584 in pertinent part reads:

Introduction and Scope

This GERAN description describes the key new ideas needed to introduce statistical multiplexing of all bearer classes on the GERAN air interface for delivery over the packet-switched network. It focuses only on the support of overall UMTS service requirements, and does not address network architecture issues or circuit-switched services.

The central new service requirement for GERAN (compared to EGPRS Phase 1) is the support of speech service using the packet-switched backbone network. The focus of the document is the definition of new traffic and control channels to support statistical multiplexing of speech, real-time data, and non-real-time data, and the corresponding new MAC procedures that are needed to guarantee QoS.

List of Acronyms

| | |
|---|---|
| AMR | Adaptive Multi-Rate |
| ARI | Access Request Identifier |
| BCCH | Broadcast Control Channel |
| BEP | Bit Error Probability |
| BFACCH | Burst-based FACCH |
| CCCH | Common Control Channel |
| CID | Carrier Identifier |
| CTS | Carrier Time Slot |
| DBMCH | Downlink Block Message Channel |
| DFACCH | Dim-and-Burst FACCH |
| DMT | Downlink (Burst) Message Type |
| DPRCH | Downlink Periodic Reservation Channel |

-continued

List of Acronyms

| | |
|---|---|
| DTCH/FS | Downlink Traffic Channel for Full Rate Speech |
| DTCH/HS | Downlink Traffic Channel for Half Rate Speech |
| DTCH/FD | Downlink Traffic Channel for Full Rate Data |
| DTCH/HD | Downlink Traffic Channel for Half Rate Data |
| EDT | End Downlink Traffic |
| EEP | Equal Error Protection |
| EGPRS | Enhanced General Packet Radio Service |
| EUT | End Uplink Traffic |
| FACCH | Fast Associated Control Channel |
| FACKCH | Fast Acknowledgment Channel |
| FASSCH | Fast Assignment Channel |
| FFS | For Further Study |
| FR | Full-Rate |
| FRACH | Fast Random Access Channel |
| GERAN | GSM/EDGE Radio Access Network |
| HR | Half-Rate |
| IP | Internet Protocol |
| L1 | Layer 1 (Physical Layer) |
| MAC | Medium Access Control |
| MCS | Modulation and Coding Scheme |
| MR | Measurement Report |
| MS | Mobile Station |
| MSACCH | Modified Slow Associated Control Channel |
| NRT | Non-Real Time |
| OFF | Offset in Frames |
| PBCCH | Packet Broadcast Control Channel |
| PCCCH | Packet Common Control Channel |
| PDCP | Packet Data Convergence Protocol |
| PH | Phase |
| QoS | Quality of Service |
| RAB | Radio Access Bearer |
| RAN | Radio Access Network |
| RDC | Reassign Downlink Control |
| RDT | Reassign Downlink Traffic |
| RLC | Radio Link Control |
| RR | Radio Resource Management |
| RRBP | Relative Reserved Burst Period |
| RT | Real Time |
| RTP | Real Time Protocol |
| RUC | Reassign Uplink Control |
| RUT | Reassign Uplink Traffic |
| SACCH | Slow Associated Control Channel |
| SD | Start Delay |
| SDT | Start Downlink Traffic |
| SID | Silence Descriptor |
| SUT | Start Uplink Traffic |
| TBF | Temporary Block Flow |
| TBFI | Temporary Block Flow Identifier |
| TCP | Transport Control Protocol |
| TFI | Temporary Flow Identifier |
| TS | Time Slot |
| UDP | User Datagram Protocol |
| UEP | Unequal Error Protection |
| UBMCH | Uplink Block Message Channel |
| UPRCH | Uplink Periodic Reservation Channel |
| UMT | Uplink (Burst) Message Type |
| UMTS | Universal Mobile Telecommunications System |
| USF | Uplink State Flag |
| UTCH/FS | Uplink Traffic Channel for Full Rate Speech |
| UTCH/HS | Uplink Traffic Channel for Half Rate Speech |
| UTCH/FD | Uplink Traffic Channel for Full Rate Data |
| UTCH/HD | Uplink Traffic Channel for Half Rate Data |
| UTRAN | UMTS Terrestrial Radio Access Network |
| VAD | Voice Activity Detection |

Service Requirements

Service requirements for GERAN are based on those of UMTS, with the addition of an optimized speech service based on GSM/AMR. These requirements describe the radio bearer classes, the need for parallel bearer flows, handover, and alignment with UMTS core network. Specific error, throughput, and delay requirements for each bearer class are FFS, but range of capabilities is clear from current UMTS requirements.

Support of Radio Bearer Classes in Alignment with UMTS

The UMTS radio bearer classes for conversational, streaming, interactive, and background services cover a range of real-time and non-real-time data services with a wide range of error, throughput, and delay requirements. The GERAN requirements for these services will be aligned with UMTS with adjustments as necessary to capture unique characteristics of the GERAN.

Voice service requirements are based on those of GSM/AMR. A GERAN radio bearer class will be specifically optimized for voice service.

Support for Parallel Bearer Flows with Different QoS

The GERAN shall support up to three parallel bi-directional bearer flows with different QoS requirements. This capability will enable support of simultaneous voice and data service as well as multimedia service.

Handover Requirement for RT Services

Voice and real-time data services have QoS characteristics not supported by existing EGPRS reselection procedures. The GERAN shall include procedures to support maintenance of acceptable (TBD) QoS during network-assisted handover procedures for voice and real-time data services. The details of these handover procedures are outside the scope of this document.

Alignment with UMTS Core Network

The GERAN shall conform to the core network interface requirements established for UMTS with only those changes necessary to adapt to unique characteristics of the GERAN. In particular, this requires that the GERAN provide the Iu-ps interface to the UMTS core network.

Targeted Configuration

Blocking Limited Deployment

The present invention is optimized for blocking limited deployment, where the greatest capacity is achieved by utilizing available traffic-carrying channels to the fullest degree. In a blocking limited deployment, traditional circuit channels for delivery of voice and real-time data services are inefficient due to significant periods of "dead time" during a typical flow. For voice service with a voice activity factor approximately 40%, there is considerable potential to increase overall capacity with statistical multiplexing of traffic channel resources.

Interference Limited Deployment

Since an interference-limited system must operate at some fraction of its channel capacity to achieve acceptable aggregate performance, statistical multiplexing typically offers little or no capacity advantage. However, interference-limited deployment (e.g. 1/3 reuse) becomes blocking limited with techniques like beam forming and power control. It is more appropriate to optimize the GERAN for deployment configurations that take advantage of the application of the latest interference management techniques, which make them more blocking limited. This approach assures that the greatest capacity benefits are available in all configurations.

Less Aggressive Reuse (e.g. 4/12) Preferred when Spectrum Available

Blocking limited deployment is and will be common for the foreseeable future. Blocking limited deployment is preferred in areas not limited by availability of spectrum. It is also preferred in areas where uniform quality of service is a requirement, since coverage "holes" become more common when operating in interference limited conditions.

All New Traffic and Control Channels

The present invention introduces new traffic and control channels that are completely compatible with beam forming and power control techniques, enabling their use for all new traffic and control channels. This is achieved by designing all communication on these channels to be point-to-point. There are no multicast or broadcast control messages or control fields in any downlink transmissions. In particular, no USF is required in any downlink burst.

Multiplexing Principles

The benefits of statistical multiplexing are achieved through the application of the following principles.

Unidirectional Traffic and Control Channels

All new control and traffic channels are unidirectional, with independent frequency and slot allocation in the uplink and downlink directions. Available resources can be dynamically allocated as necessary to traffic and control channel functions. This allows for maximum flexibility in allocation of available resources. Breaking the historical association between uplink and downlink channels is necessary for statistical multiplexing of speech, in particular, since the uplink and downlink resource demands occur independently. Breaking the association between uplink and downlink maximizes the resource pool available for assignment when new data or speech becomes available for transmission.

A primary consideration for any new GERAN concepts must be the impact on half-duplex mobiles, given their cost advantages. A companion paper specifically addresses half-duplex mobile consideration. The new control and traffic channels are specifically designed to support half-duplex mobiles in a manner that maximizes the pool of traffic and control channel resources available for assignment to these mobiles.

Another consideration for further study is the impact of variable uplink/downlink carrier separation on mobiles.

EGPRS Phase 1 and Phase 2 Traffic on Different Time Slots

Because of the need to allocate uplink and downlink channels independently, it is not possible to multiplex EGPRS Phase 1 and Phase 2 (GERAN) traffic on the same time slot. This traffic must be segregated onto separate time slots at any one time.

Multiplexing Different QoS Classes

This invention includes the multiplexing of all QoS classes onto the same channels. The same uplink an downlink resource pools are shared among all flows, regardless of their QoS class, maximizing the advantages of statistical multiplexing.

Operation of TBF Establishment

The concept of a Temporary Block Flow (TBF) of GPRS/EGPRS is enhanced in the GERAN to have a unique profile with direction, QoS, and protocol attributes.

Negotiation of TBF Profile

Before establishment of any TBF between a mobile and the network, it camps on the CCCH or PCCCH in the current cell, and is governed by procedures currently defined in EGPRS. When the first TBF is established, its attributes are defined as follows:

The TBF is either unidirectional (uplink or downlink) or bi-directional. A voice TBF would typically be bi-directional. A data TBF could be either unidirectional or bi-directional. Data traffic requiring any significant exchange, such as upper layer acknowledgments, could be bi-directional, thus saving the overhead of repeated TBF establishment for periodic traffic.

The TBF is assigned QoS attributes consistent with the desired service quality and bearer class. Given the assigned QoS attributes, the TBF may also be eligible for network-directed handover procedures to minimize service disruption while switching between two cells.

The TBF is assigned protocol attributes. For example, for voice service the TBF uses physical layer channel coding optimized for voice, and eliminates headers associated with other protocol layers. Data services will typically require physical layer channel coding optimized for data and the presence of the headers for all protocol layers to control more complex protocol functions.

MAC Procedures for Established TBF

Once the first TBF is established, the mobile remains on the new RT traffic and control channels, regardless of the presence or absence of data to send, until all TBFs for the mobile are released. Each TBF remains valid regardless of activity until it either times out or is explicitly released by the network.

Channels for Fast Resource Assignment

When there is no data transfer in the downlink direction (no downlink traffic channel is assigned to the TBF), the mobile must monitor a common downlink control channel for fast resource assignment directives. These assignment directives assign traffic channel resources to the TBF as needed to support data transfer with the agreed-to QoS attributes.

When the TBF has an active downlink traffic channel assignment, it typically monitors the same physical channel for fast associated control channel messages with alternative assignment directives. As an alternative for mobiles with adequate multi-slot capability, the mobile may be required to monitor both the downlink traffic channel for user data and a common downlink control channel for fast assignment directives.

When a mobile has more than one TBF active in the downlink direction, it may be required to monitor either a common downlink control channel and/or one (or more) of the downlink traffic channels for fast assignment directives.

Traffic Channel Assignment

When the TBF requires a downlink traffic channel for data transfer, the network sends a fast assignment directive to the mobile to allocate a downlink traffic channel for the data transfer.

When the TBF requires an uplink traffic channel for data transfer, the mobile sends a fast access request on an uplink fast access control channel. The network responds with a fast assignment directive to allocate the necessary uplink resource.

In all cases, since QoS and protocol attributes have been negotiated during establishment of the TBF, there is no ambiguity as to the parameters of the resource request or assignment. These attributes do not change from one resource request or assignment to the next during a TBF.

Timing Alignment and Power Control

For as long as a mobile has at least one TBF established, it remains in timing alignment and under power control. This allows for all access bursts to be of normal length, since abbreviated bursts are not needed to allow for misalignment. This also avoids the extra overhead of performing these functions at the beginning of each traffic channel assignment.

Protocol and Architecture

Figure 2:
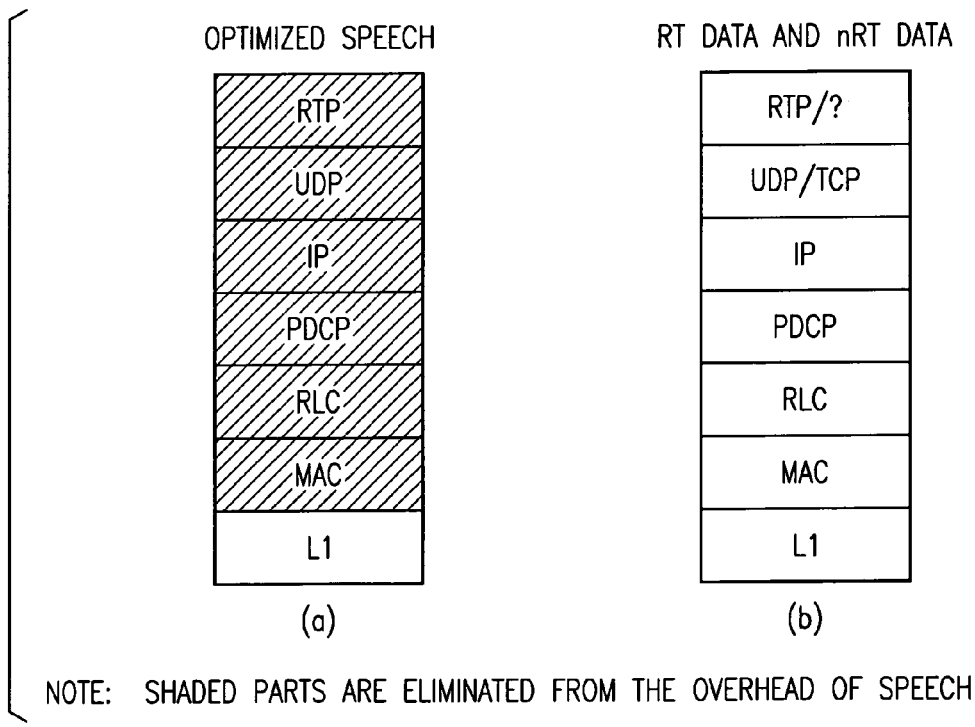
FIG. 2 illustrates the user plane protocol stack for Pre-GERAN and GERAN systems.
Figure 3:
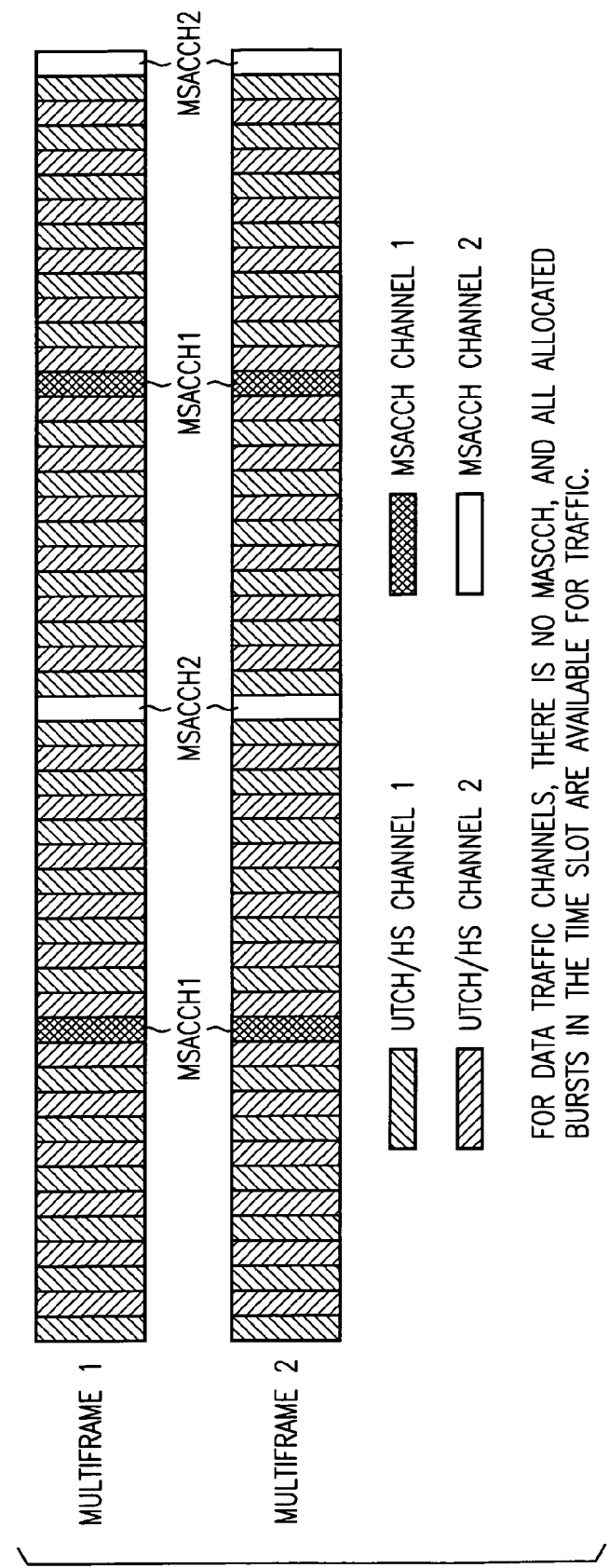
FIG. 3 illustrates two multiframes each of which is divided into four channels of various types.
Figure 4:
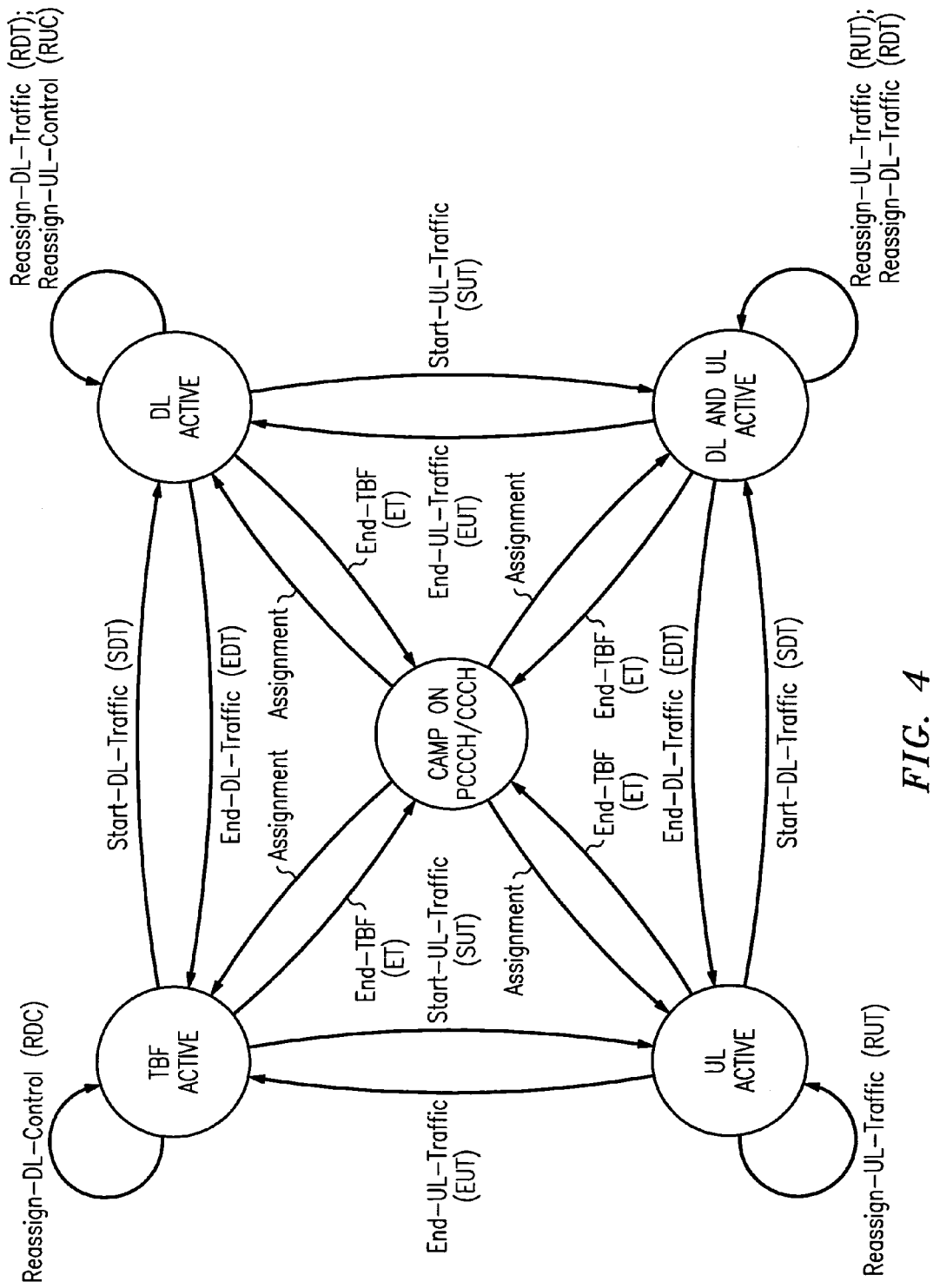
FIG. 4 illustrates a state diagram for a system in accordance with the invention.

To support optimized speech, RT and NRT users over packet bearer, two different protocol stacks are used in the present invention to meet the requirements of optimized speech and data bearers, as shown in FIG. 2.

The protocol stack used for a particular TBF is negotiated at the TBF setup along with the QoS attributes. For optimized speech bearer, a dedicated unidirectional traffic channel is allocated to a speech TBF during a talk spurt. Hence no RLC/MAC header is used. The IP/UDP/RTP header information is exchanged at speech TBF setup and is, therefore, eliminated from the speech frame transmission over the RF interface. So, the entire shaded area of the protocol stack is dispensed with for optimized speech users, but not for RT and NRT data users.

For RT and NRT data users, the EGPRS Phase 2 protocol stack is kept. Possible optimization for RT data bearers is FFS. RLC The GERAN will reuse the EGPRS Phase 1 RLC with only those extensions needed to adapt RLC procedures to the new RT traffic and control channels.

MAC

The RT MAC is new for the GERAN, based on the fast access and assignment procedures of an embodiment of the present invention.

Radio Interface Aspects

The GERAN Layer 1 is an enhanced version of the EGPRS Phase 1 Layer 1. Enhancements are related to the introduction of new types of traffic and control channels, as described below.

Traffic Channel Design

All traffic channels in GERAN are considered to be unidirectional channels. Chain interleaving is done on speech traffic channels and block interleaving for data. Half-rate traffic channels use alternate bursts. This has a significant multiplexing advantage for half-duplex mobiles. In the case of NRT data, it permits ease of multiplexing with RT data and voice.

Speech, RT and NRT users may share a time slot by being assigned to two different half-rate channels on the same slot. A half-rate or a full-rate traffic channel is allocated to a specific speech or data user for the duration of a talk spurt or "data spurt". No headers or stealing bits are required for the receiver to distinguish between these traffic channels. For data channels, stealing bits and header formats are used as in EGPRS Phase 1, but the USF is eliminated on the downlink.

All traffic channel assignments are through messaging on the new control channels (including TCH associated control channels).

Speech Traffic Channel Design Principles

Speech traffic channels are based on supporting the GSM/AMR modes on full-rate and half-rate channels. The full-rate channel coding for the GSM/AMR modes is the same as in current GSM/AMR. The channel coding for half-rate AMR modes will be based on either 8PSK or QPSK modulation, depending on the results of separates studies.

Interleaving

Interleaving in all cases will be chain interleaving over 40 msec, as in GSM/AMR. For a full-rate traffic channel the interleaving is over 8 radio bursts in 40 msec, with a chaining overlap of 4 radio bursts in 20 msec. For a half-rate traffic channel, the interleaving is over 4 radio bursts spaced over 40 msec, with a chaining overlap of 2 radio bursts in 20 msec. This half-rate interleaving mode is sometimes described as 0246/1357, to describe the use of alternate bursts for each of two half-rate channels over the 8 bursts in a 40 msec interval. The alternative of block interleaving of 2 speech frames over 4 consecutive bursts in 20 msec intervals alternating between two half-rate channels is sometimes called 0123/4567 interleaving.

Compatibility with Half-Duplex Mobiles

Half-duplex mobiles typically have severe constraints on the combination of uplink and downlink channels that they can support. This is an important consideration since statistical multiplexing works more efficiently with a larger pool of resources available for allocation. Investigation has shown that the best statistical multiplexing efficiency is achieved for half-duplex mobiles by defining all half-rate traffic and control channels to use no more than every other burst on any one time slot. This burst allocation for half-rate speech channels is discussed below.

Headers

Since the entire channel (either full-rate or half-rate) is dedicated to a TBF for the length of a talk spurt, there is no need for additional header beyond what is in existing GSM/AMR.

Half Speech Block

With chain interleaving, half of the information transmitted in the first and last 20 msec intervals of a talk spurt is typically unusable. Since AMR has multiple compatible modes of operation with different sizes of speech frames every 20 msec, it is possible to define new channel coding for these currently unused bits to transmit special speech frames. For example, with the 7.4 kbps mode of operation, it is possible to specify alternative channel coding on the first block of unused bits to encode a single 4.75 kbps speech frame. The performance of this half speech block is somewhat worse than the performance of the remaining speech frames, but the overall impact on the quality of a typical talk spurt is small.

Use of the half speech block reduces the delay to the beginning of a talk spurt by 20 msec. By starting a talk spurt with a half speech block, the overall time on the traffic channel is also reduced by 20 msec (corresponding to the first 20 msec interval typically needed to start up a chain interleaving sequence. By using a half speech block for the last speech frame of a talk spurt, which is relatively unimportant to the intelligibility of the talk spurt, the overall time on the traffic channel is reduced by an additional 20 msec (for a total of 40 msec). This is accomplished by eliminating the need to transmit the last 20 msec portion of the last valid speech frame.

The half speech block could also be used in the middle of a talk spurt to free up room to transmit a frame of control information. This is called "dim-and-burst" signaling as opposed to "blank-and-burst" signaling, which replaces an entire speech frame with a frame of control information. This "dim-and-burst" concept is introduced as a new associated control channel below.

Initial Burst of a Talk Spurt

In GSM, interleaving must begin on a radio block boundary, which occurs every 20 msec. Since every talk spurt is specifically assigned to a traffic channel, it is not necessary to maintain this 20 msec granularity. Allowing a talk spurt to begin on any burst improves the average delay to the beginning of a talk spurt by approximately 5 msec for half-rate channels, since the assignment granularity is reduced from 20 msec to 10 msec. The average improvement for full-rate channels is approximately 7.5 msec, since the assignment granularity is reduced from 20 msec to 5 msec.

AMR VAD and Hangover

The current AMR VAD and hangover interval are not designed to provide optimal performance in a system with statistical multiplexing of speech. They are both candidates for further study to reduce the average length of talk spurts without significantly increasing the rate of occurrence of talk spurts (which would cause an increase in load on the RT control channels). For example, it should be possible to reduce the hangover interval from 7 frames to a lower number such as 2 or 3. It is not yet known how this would impact control channel load or the occurrence of speech clipping.

Data Traffic Channel Design Principles

The data traffic channels are designed for full compatibility with the speech traffic channels, while reusing the MCS1 through MCS9 channel coding schemes defined for EGPRS.

Interleaving

For full-rate data channels, the interleaving is 0123/4567 block interleaving as defined in EGPRS. There is no need to deviate from EGPRS since the TBF has exclusive use of the channel until it is explicitly reassigned.

For half-rate data channels, the interleaving is 0246/1357 block interleaving, where each data block is interleaved over 4 consecutive odd or even bursts (alternate bursts).

Compatibility with Half-Duplex Mobiles

As in section 7.1.2, half-rate data traffic channels have the same advantages in statistical multiplexing efficiency as half-rate speech traffic channels.

Headers

Since the entire channel (either full-rate or half-rate) is dedicated to a TBF for the length of a data spurt, there is no need for additional header beyond what is in existing EGPRS. The USF is unused and could be redefined for other purposes. The TFI is similarly unused in this approach as defined, but has potential value for additional data multiplexing options if replaced with the ARI and/or TBFI, as defined in section 0.

Initial Burst of a Talk Spurt

As mentioned above, data channels may begin a data spurt on any assigned burst, offering the same improvement in delay to the beginning of the data spurt as for a talk spurt.

Traffic Channel Definition

The following traffic channels are defined.

Downlink Traffic Channel for Full Rate Speech (DTCH/FS). This channel comprises an entire time slot with eight burst chain interleaving. This channel uses GMSK modulation and unequal error protection.

Downlink Traffic Channel for Half Rate Speech (DTCH/HS). This channel comprises one half of a time slot on alternate bursts with four burst chain interleaving. Channel 1 on the time slot comprises even-numbered bursts, channel 2 comprises odd-numbered bursts. The modulation and coding schemes are to be specified.

Downlink Traffic Channel for Full Rate Data (DTCH/FD). This channel comprises an entire time slot with four burst block interleaving. EGPRS Phase I modulation and coding schemes (MCS1–MCS9) are used for the blocks. The USF is freed up.

Downlink Traffic Channel for Half Rate Data (DTCH/HD). This channel comprises one half of a time slot on alternate bursts with four burst block-interleaving. Channel 1 on the time slot comprises even-numbered bursts, channel 2 comprises odd-numbered bursts. EGPRS Phase I modulation and coding schemes (MCS1–MCS9) are used for the blocks (four alternate bursts). The USF is freed up.

Uplink Traffic Channel for Full Rate Speech (UTCH/FS). This channel comprises an entire time slot with eight burst chain interleaving. This channel uses GMSK modulation and unequal error protection.

Uplink Traffic Channel for Half Rate Speech (UTCH/HS). This channel comprises one half of a time slot on alternate bursts with four burst chain interleaving. Channel 1 on the time slot comprises even-numbered bursts, channel 2 comprises odd-numbered bursts. The modulation and coding schemes are to be specified.

Uplink Traffic Channel for Full Rate Data (UTCH/FD). This channel comprises an entire time slot with four burst block interleaving. EGPRS Phase I modulation and coding schemes (MCS1–MCS9) are used for the blocks.

Uplink Traffic Channel for Half Rate Data (UTCH/HD). This channel comprises one half of a time slot on alternate bursts with four burst block interleaving. Channel 1 on the time slot comprises even-numbered bursts, channel 2 comprises odd-numbered bursts. EGPRS Phase I modulation and coding schemes (MCS1–MCS9) are used for the blocks (four alternate bursts).

Half-Rate Traffic Channel Structure

Half-rate traffic channels comprise either even-numbered bursts (channel 1) or odd-numbered bursts (channel 2) of a time slot. This even or odd burst allocation of a half-rate traffic channel is not changed in a multiframe. It is worth noting that for current GSM traffic channels, the burst allocation alternates every 13 frames within a multiframe between odd bursts and even bursts. This change in burst allocation is necessary for maximum compatibility with half-duplex mobiles.

For data traffic channels, there is no MSACCH, and all allocated bursts in the time slot are available for traffic.

Multiplexing of Speech and Data Traffic

Two different half-rate traffic channels (speech or data) may be assigned to the two different phases, i.e. odd-numbered bursts or even-numbered bursts, of a time slot. The speech traffic channels (half-rate or full-rate) are allocated to a speech user for the duration of a talk spurt. A simplified fixed allocation procedure allocates an entire data traffic channel (either full-rate or half-rate) continuously to a TBF for the duration of a data spurt.

There is no multiplexing with full-rate speech users during a talk spurt, or with full-rate data users during a data spurt. After a full-rate talk or data spurt ends, the corresponding time slot is available for allocation to a full-rate or half-rate voice or data TBF.

Real Time Control Channel Design

New RT control channels provide the fast resource allocation needed to perform statistical multiplexing of voice and real-time data services. A burst-based contention access procedure allows a MS camped on the RT control channel to signal for uplink resource whenever an uplink traffic flow transitions from inactive to active (e.g. when the next talk spurt starts for a speech user). The mobile's Access Request Identifier, ARI, is transmitted in the access burst, which allows the network to immediately perform contention resolution. The network also includes the ARI in single-burst fast assignment messages in the downlink. Fast retry with 5 msec granularity increases the robustness of the single burst access and fast assignment scheme. Fast reassignment and termination provides the network the ability to allocate and reallocate resources and satisfy the QoS of RT TBFs.

Control Channel Functions

The existing BCCH or PBCCH provides the broadcast information needed for the mobile to access the GERAN. The existing CCCH or PCCCH provide the capability to negotiate the attributes of the initial TBF and to communicate the parameters needed for access to the RT control channels. Once in a voice, RT data or NRT data TBF, the following functions are needed (unless an exception is listed).

Access Request

The mobile must have the ability to request uplink resources on behalf of a TBF.

Traffic and Control Channel Assignment

The network must have the ability to make traffic and control channel assignments (for both uplink and downlink resources) to the mobile.

End-of-TBF Control

The mobile must have the ability to request the network to end a particular TBF. The network must have the ability to direct a mobile to immediately terminate a TBF.

Acknowledgment of Network Directives

The mobile must have the ability to acknowledge traffic and control channel assignments and end-of-TBF directives to trigger any necessary retry procedures to assure rapid resource allocation.

Timing Advance and Power Control

The network must be able to signal to the mobile any necessary adjustments in timing advance and power control.

Handover Signaling

If a mobile has an established TBF for voice or RT data, it is eligible for handover procedures. In this case, the mobile is required to provide periodic neighbor cell measurement reports to the network. The network will send the necessary handover directives to the mobile as appropriate to maintain the mobile under control of the RT control channels during and after handover to minimize service disruption.

Negotiation of Additional TBFs

It must be possible for either the mobile or network to begin negotiation of additional TBFs while under control of the RT control channels, subject to the multi-slot capabilities of the mobile. In particular, it must be possible to establish a default data TBF for control signaling while under control of the RT control channels.

AMR Signaling

During a voice TBF, it must be possible for the network to send periodic AMR mode commands to the mobile. During a voice TBF outside of a downlink talk spurt, it must be possible for the network to send periodic SID information to the mobile.

During a voice TBF, it must be possible for the mobile to send periodic AMR mode requests to the network. During a voice TBF outside of an uplink talk spurt, it must be possible for the mobile to send periodic SID information to the network.

RLC Signaling

RLC signaling may include, for example, ack/nack messages, and BEP measurements.

During a data TBF in the process of communicating in the downlink direction, it must be possible for the mobile to send periodic RLC control messages to the network.

During a data TBF in the process of communicating in the uplink direction, it must be possible for the network to send periodic RLC control messages to the mobile.

If a data traffic channel has already been allocated to a TBF in a direction requiring transmission of an RLC control message, existing RLC procedures already allow RLC control messages to be freely multiplexed with RLC data frames.

Control Channel Design Principles

The key functions of the RT control channels that enable statistical multiplexing are fast access, assignment, and acknowledgment. The following principles assure the rapid performance of these functions.

Burst-Based Channels

All fast access, assignment, and acknowledgment channels use single burst messages. This assures high capacity, point-to-point transmissions for compatibility with beam steering and power control procedures, and fine temporal granularity, with a transmission opportunity every 5 msec.

Access Request Identifier

Each mobile is assigned an ARI as a unique identifier during access and assignment procedures on the RT control channels. By including the ARI in the access burst, the network performs contention resolution immediately rather than waiting for contention resolution procedures on a traffic channel, as in GPRS and EGPRS. The network may respond immediately with a single burst assignment message including the ARI.

Half-Rate and Full-Rate Channels

The fast access, assignment, and acknowledgment channels are typically allocated a full-rate channel with all the bursts in a given slot. As an alternative, these channels may also be allocated as half-rate channels using either all odd or all even bursts in a slot. Note in particular that a fast access channel is completely allocated for contention access. The network does not broadcast USF to signal contention opportunities. Since there is no need to monitor USF, this saves up to 40 msec in waiting to perform an access attempt in certain situations.

Fast Retry

Since all full-rate access, assignment, and acknowledgment channels have 5 msec granularity, this allows for rapid retry of these procedures up to once every 5 msec. Half-rate channels have a 10 msec granularity. Even with a high error rate on these channels, access and assignment procedures can be performed quickly and efficiently. Note that frequency hopping is desirable on these channels to reduce or eliminate burst-to-burst fading correlation.

Fast Control Channel Assignment

The fast access, assignment, and acknowledgment channels are allocated at the establishment of a TBF, and continue to be used throughout the TBF unless they are reassigned.

Associated Control Channel Definitions

Several new associated control channels are defined to support the necessary control channel functions while the mobile is active on a traffic channel in the direction that control signaling is required.

Fast Associated Control Channel (FACCH)

A FACCH is associated with each traffic channel defined in 0. Thus the FACCH associated with the DTCH/FS is referred to as FACCH/DFS, for FACCH on a downlink full-rate speech channel. Other FACCH channels are named consistently. Standard FACCH coding as in GSM AMR bearer is used.

Dim-and-Burst FACCH (DFACCH)

A DFACCH is associated with each traffic channel defined in 0. Thus the DFACCH associated with the UTCH/FS is referred to as DFACCH/DFS. Other DFACCH channels are named consistently.

DFACCH coding is for further study.

Burst-Based FACCH (BFACCH)

A BFACCH is associated with each traffic channel defined in 0. Thus the BFACCH associated with the DTCH/FS is referred to as BFACCH/DFS. Other BFACCH channels are named consistently.

Burst based control messages are transmitted over BFACCH replacing single burst speech or data for fast access, assignment and acknowledgment while on a traffic channel. BFACCH is distinguished from speech or data traffic using a new training sequence or stealing bits. BFACCH channel coding is for further study.

Modified Slow Associated Control Channel (MSACCH)

A MSACCH is associated with each traffic channel defined in 0. Thus the MSACCH associated with the DTCH/FS is referred to as MSACCH/DFS. Other MSACCH channels are named consistently.

A MSACCH is a set of reserved bursts on a periodical basis and has the same structure as SACCH defined for GSM speech traffic channels.

Block based signaling messages, e.g. Neighbor Measurement Report, are transmitted over MSACCH.

Common Uplink Control Channel Definition

Fast Random Access Channel (FRACH)

A FRACH is designed to transmit single burst fast contention access messages. The traffic on the FRACH is isolated from the RACH and PRACH. Since the mobiles accessing on the FRACH are assumed to be time-aligned, the guard period on the FRACH burst is shorter and the message size can be larger. The maximum message length on the FRACH is TBD.

A FRACH comprises either a full time slot on all bursts (full-rate), or a half time slot on alternate bursts (half-rate).

Fast Acknowledgment Channel (FACKCH)

A FACKCH is designed to transmit single burst messages to acknowledge assignments and termination directives from the network. FACKCH transmissions occur in reserved bursts.

Single burst acknowledgment message is transmitted on FACKCH on a polled basis using a RRBP scheme. This permits multiple burst-based assignment/acknowledgment sequences to be completed within a 20-msec block period and improves the speed and reliability of real-time statistical multiplexing.

A FACKCH comprises either a full time slot on all bursts (full-rate), or a half time slot on alternate bursts (half-rate).

Uplink Periodic Reservation Channel (UPRCH)

An UPRCH is used to transmit signaling messages that need to be updated on a periodic basis, e.g. SID_Update and Neighbor Measurement Report. It is possible that a traffic channel is relinquished (e.g. when a talk spurt ends) before a signaling message (e.g. spans 480 ms) is transmitted completely on the MSACCH. An UPRCH is designed for MSACCH signaling continuity when an uplink traffic channel is released.

An UPRCH is released at the assignment of an uplink traffic channel, and is reassigned each time at the release of an uplink traffic channel.

A UPRCH comprises either a full time slot on all bursts (full-rate), or a half time slot on alternate bursts (half-rate). The network reserves one of every 26 bursts on a full-rate UPRCH for each voice TBF not in an uplink talk spurt. 26 voice TBFs can simultaneously share a full-rate UPRCH.

Uplink Block Message Channel (UBMCH)

An UBMCH is designed for block (4 bursts) messages, e.g. RLC signaling, using polled reservation bursts in a RRBP-like scheme.

Common Downlink Control Channel Definition

Fast Assignment Channel (FASSCH)

A FASSCH is designed to transmit single burst assignment and termination messages when there is no downlink traffic allocated to the MS. Different messages are used to assign downlink traffic channels, downlink control channels, uplink traffic channels, and uplink control channels.

A FASSCH comprises either a full time slot on all bursts (full-rate), or a half time slot on alternate bursts (half-rate).

Downlink Periodic Reservation Channel (DPRCH)

A DPRCH is used to transmit signaling messages that need to be updated on a periodic basis, e.g. SID_Update, timing advance, and power control. It is possible that a traffic channel is relinquished (e.g. when a talk spurt ends) before a signaling message (e.g. spans 480 ms) is transmitted completely on the MSACCH. A DPRCH is designed for MSACCH signaling continuity when a downlink traffic channel is released.

A DPRCH is released when the downlink traffic channel is assigned, and reassigned each time at the release of the downlink traffic channel.

A DPRCH comprises either a full time slot on all bursts (full-rate), or a half time slot on alternate bursts (half-rate). The network reserves one of every 26 bursts on a full-rate DPRCH for each voice TBF not in a downlink talk spurt. 26 voice TBFs can simultaneously share a full-rate DPRCH.

Downlink Block Message Channel (DBMCH)

A DBMCH is designed for block (4 bursts) messages, e.g. RLC signaling, handover directives, etc.

Multiplexing of Common Control Channel

The FRACH, FACKCH, UPRCH, FASSCH, and DPRCH may be either full-rate or half-rate control channels. A full-rate control channel uses all bursts in each multiframe. A half-rate control channels uses either every odd or every even burst in each multiframe.

These channels are not multiplexed on the same full-rate or half-rate channel.

Two different half-rate control or traffic channels may be assigned to the two different phases (all odd or all even) of a slot. Note that the burst allocation for half-rate control channels is compatible with and identical to the burst allocation for half-rate traffic channels. The multiplexing of DBMCH and UBMCH with other common control channel is FFS.

Overview of Real Time TBF Operation

The definition of TBF (GPRS Phase 1) is enhanced to support RT services. Each RT TBF may be bi-directional (e.g. speech) or unidirectional (e.g. best effort data). The initial establishment of a RT TBF is carried on a PCCCH or CCCH. Each RT TBF has an associated TBF profile. The negotiation of a RT TBF profile during TBF setup includes the QoS requirements and the protocol stack supported by the RAB.

Additional information that is exchanged during initial TBF setup includes the following:

A temporary MS Access Request Identifier, ARI, is allocated by the network and is sent to the MS.

Carrier information (including frequency-hopping sequence) is communicated to the MS, either by broadcast message over PBCCH/BCCH or explicit signaling. The details are FFS.

TBF identifier (TBFI) is assigned to the MS per requested TBF.

TBF Inactivity Timer is negotiated for RT and NRT data TBFs. It is optional for RT speech TBF (FFS).

Once a RT TBF is established, the MS is assigned a set of RT control channels, namely FRACH, FACKCH, UBMCH and UPRCH for uplink signaling, and FASSCH, DBMCH and DPRCH for downlink signaling and control. An UPRCH (or a DPRCH) may be reassigned each time an UTCH (or a DTCH) is released. The rest of the control channels, i.e. FRACH, FACKCH and UBMCH for uplink, and FASSCH and DBMCH for downlink, do not need to be reassigned for the duration of the TBF.

The uplink and/or downlink traffic associated with the RT TBF is activated independently using fast access and fast assignment procedures. Additional RT and NRT TBF(s) can be negotiated and established on the RT control channel(s).

An established bi-directional TBF has the following 4 states: TBF Inactive, DL Active, UL Active, and DL and UL Active. The state transition diagram for a single bi-directional RT TBF is shown in FIG. 6. The state transitions for a unidirectional RT TBF and NRT TBF (as defined in EGPRS Phase 1) are a subset of the states and allowable transitions associated with bi-directional RT TBF.

RT TBF State Definition

An established bi-directional RT TBF has four states, as shown in FIG. 6. Channel allocation is also shown in FIG. 5 (Table 1).

RT TBF State: TBF Inactive

In this state, there is no uplink or downlink traffic channel assigned to the MS for the TBF. The MS and the network may independently initiate uplink and downlink traffic, set up a new TBF, end a current TBF, or end all TBFs associated with the MS. The network may also reassign common control channels to the MS.

A timer may be associated with this state per RT TBF, which allows the MS to be in TBF established state for a configurable time after the downlink and uplink traffic end. This avoids re-negotiation of the RT TBF profile, should downlink or uplink traffic flow resume within a short period of time.

RT TBF State: DL Active

In this state, the MS is assigned a downlink traffic channel associated with the RT TBF. Downlink single burst messages are transmitted using BFACCH. Other downlink signaling and control messages are transmitted using FACCH and/or MSACCH.

Uplink signaling and control messages are carried on uplink common channels assigned to the MS, which are shared among parallel TBFs the MS may have established.

New TBFs may be initiated on the RT control channels.

RT TBF State: UL Active

In this state, the MS is assigned an uplink traffic channel associated with the RT TBF.

Uplink single burst messages are transmitted using BFACCH. Other uplink signaling and control messages are transmitted using FACCH and/or MSACCH.

Downlink signaling and control messages are carried on downlink common control channels assigned to the MS, which are shared among parallel TBFs the MS may have established.

New TBFs may be initiated on the RT control channels.

RT TBF State: DL and UL Active

In this state, the MS is assigned an uplink traffic channel and a downlink traffic channel associated with the RT TBF.

Both downlink and uplink single burst messages are transmitted using BFACCH. Other signaling and control messages are transmitted using FACCH and/or MSACCH.

New TBFs may be initiated on the RT control channels.

Procedures Associated with Single RT TBF State Transition

A set of procedures is defined to perform the state transitions associated with an RT TBF. Table 2 shows the procedures associated with each single RT TBF state transition and the applicable states involved. The definitions and message flows for the procedures are further described below.

Control Messages

Uplink Signaling and Control Messages FIG. 7 (table 3) provides a summary of the uplink signaling and control messages and the control channels used.

Access Request

This single burst message is sent over BFACCH if an UTCH is allocated; otherwise it is sent over FRACH. Its usage and contents are further described in Section 0.

Acknowledge to Assignment

This set of single burst messages is sent over BFACCH if an UTCH is allocated; otherwise they are sent over FACKCH. Their usage and contents are further described later in the section devoted to that issue.

AMR Mode Request

AMR Mode Request (2 bits) is sent in-band if an UTCH is allocated. Otherwise, it is sent over UPRCH, multiplexed with other periodic signaling messages, e.g. SID Update and Neighbor Measurement Report. The details of the multiplexing of these messages are FFS.

SID Update

Sid Update is sent over UPRCH, multiplexed with AMR Mode Request and Neighbor Measure Report.

Neighbor Measurement Report

It is sent over MSACCH if a UTCH is allocated; otherwise, it is sent over UPRCH, multiplexed with other periodic signaling messages, e.g. SID Update and AMR Mode Request.

RLC Signaling

RLC signaling is sent over a UTCH or UBMCH, according to EGPRS Phase 1 RLC procedures.

End TBF Request

This single burst message is sent on BFACCH or FRACH. Its usage and contents are further described below.

A summary of uplink signaling and control massages is shown in FIG. 7 (Table 3).

Downlink Signaling and Control Messages

FIG. 8 (table 4) provides a summary of the downlink signaling and control messages, and the RT control channels used.

Assignment

All Assignment messages are burst based. They are sent over BFACCH if a DTCH is allocated; otherwise they are sent over FASSCH. Their usage and contents are further described below.

AMR Mode Command

AMR Mode Command (2 bits) is sent inband if a DTCH is allocated. Otherwise, it is sent over DPRCH, multiplexed with other periodic signaling messages, e.g. SID Update and Timing Advance. The details of the multiplexing of these messages are FFS.

SID Update

SID_Update is sent over DPRCH, multiplexed with AMR Mode Command and Timing Advance.

Handover Directives

Handover Directives are sent over FACCH if a DTCH is allocated; otherwise they are sent over DBMCH.

RLC Signaling

RLC signaling is sent over a DTCH or DBMCH, according to EGPRS Phase 1 RLC procedures.

Timing Advance

Timing Advance is sent over MSACCH if a DTCH is allocated to the MS; otherwise it is sent over DPRCH.

Power Control

Power Control is sent over MSACCH if a DTCH is allocated to the MS; otherwise it is sent over DPRCH.

End TBF Command

This single burst message is sent on BFACCH or FASSCH by the network to terminate a single TBF or all TBFs established by the MS. Its contents are further described below.

Downlink Burst Message Contents

FIG. 9 (table 5) provides a summary of downlink burst messages and their content.

Assign UTCH

This message is used to allocate an UTCH per specified TBF (identified by TBFI). The ARI field is included for fast contention resolution.

Deferred Assign UTCH

This message is used to delay assignment of UTCH for the specified TBF (identified by TBFI). The delay field indicates the period for which the mobile must wait for an assignment of uplink resource before it may try again.

Assign DTCH

This message is used to allocate a DTCH per specified TBF (identified by TBFI). RRBP field is used to indicate the reserved burst for sending the acknowledgment.

Assign UPRCH

This message is used to allocate an UPRCH to an MS for uplink periodic signaling when there is no UTCH assigned to the MS. The UPRCH is reassigned when an UTCH is released and the periodic uplink signaling on the MSACCH needs to continue on the UPRCH.

Assign DPRCH

This message is used to allocate a DPRCH to an MS for downlink periodic signaling when there is no DTCH assigned to the MS. The DPRCH is reassigned when a DTCH is released and the periodic downlink signaling on the MSACCH needs to continue on the DPRCH.

Assign FRACH

This message is used to allocate an uplink FRACH to an MS for fast contention access. A FRACH is assigned to an MS at the initial TBF setup and is usually not changed for the duration of the established TBF.

Assign FACKCH

This message is used to allocate an uplink FACKCH to an MS for sending acknowledgment on reserved bursts when polled. A FACKCH is assigned to an MS at the initial TBF setup and is usually not changed for the duration of the established TBF.

Assign FASSCH

This message is used to allocate a downlink FASSCH to an MS for monitoring assignment messages. A FASSCH is assigned to an MS at the initial TBF setup and is usually not changed for the duration of the established TBF.

End TBF Command

This message is used by the network to terminate one TBF (identified by TBFI) or all TBFs (TBFI=0) established by a MS.

Uplink Burst Message Contents

FIG. 10 (table 6) provides a summary of uplink burst messages and their contents.

Access Request

This message is used by an MS to request for UTCH per specified TBF (identified by TBFI).

Acknowledge UTCH/DTCH/UPRCH/DPRCH/FRACH/FACKCH/FASSCH

The MS uses this set of messages to acknowledge traffic and control channel assignments.

Acknowledge End TBF

The MS uses this message to acknowledge an End TBF Command.

End TBF Request

The MS uses this message to request for termination of a TBF or all TBFs (TBFI=0) established by the MS.

Information Element Definition

| IE | Name | Length (bits) | Description |
|---|---|---|---|
| ARI | Access Request Identifier | 9 | Uniquely identifiers each MS on RT control channel |
| DMT | Downlink Message Type | 4 | Identifies downlink burst message type |
| UMT | Uplink Message Type | 4 | Identifies uplink burst message type |
| TBFI | TBF Identifier | 2 | Identifies 1 of 3 possible TBFs in use by a MS; 0 identifies all TBFs for a MS |
| RRBP | Relative Reserved Burst Period | 2 | Offset to reserved uplink burst for acknowledgment of assignment |
| CID | Carrier Identifier | 4 | Identifies up to 16 carriers in current cell; Carrier descriptions provided on PBCCH or PCCCH |
| CTS | Carrier Time Slot | 3 | Time slot number on assigned carrier. |
| PH | Phase | 2 | Indicates full-rate or half-rate, and odd bursts or even bursts |

Information Element Definition

| IE | Name | Length (bits) | Description |
|---|---|---|---|
| SD | Start Delay | 1 | Indicates whether to start on 1$^{st}$ or 2$^{nd}$ eligible burst of a radio block |
| OFF | Offset | 5 | Frame number in each 26-multiframe for periodic allocation |
| delay | Delay | 6 | The number of 40 msec intervals a mobile must wait before it may again try to request an uplink traffic channel |
| reason | Reason Code | 2 | Further status for End TBF command/request |

The BBAA methods described above has been applied to a system for access and assignment to real-time and non-real-time services in GERAN as follows. The following four subsections describe the four key procedures needed to perform real-time scheduling of uplink and downlink traffic channel resources (UTCH and DTCH, respectively) in a system that statistically multiplexes voice, real-time data, and non-real-time data. Each flow of data is called a TBF (temporary block flow). Access requests occur on a fast random access channel (FRACH). Traffic channel assignments occur on either a common fast assignment channel (FASSCH) if the mobile is not on a downlink traffic channel, or on a burst-based fast associated control channel (BFACCH) that steals a single burst from ongoing downlink traffic. One of the four bursts of a traffic channel block is blanked and replaced with a burst-based control message. Acknowledgments to assignments occur on either a common fast acknowledgment channel (FACKCH) if the mobile is not on an uplink traffic channel, or on a BFACCH. At the end of an uplink (downlink) talk spurt or data spurt, the network reallocates an uplink (downlink) periodic reservation channel [UPRCH (DPRCH)] to allow continuity of slow associated control signaling between the mobile and the network.

Start Uplink Traffic (SUT)

Figure 11:
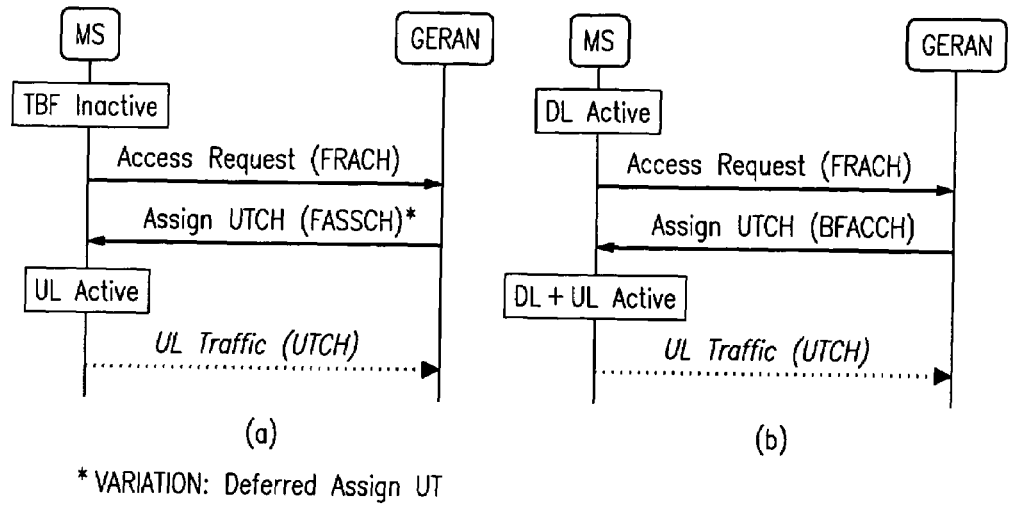

As shown in FIG. 11, a mobile station (MS) uses the SUT procedure to start an uplink traffic flow associated with a TBF. The uplink traffic flow is directed to a base station which is part of a network using GERAN methods.

End Uplink Traffic (EUT)

Figure 12:
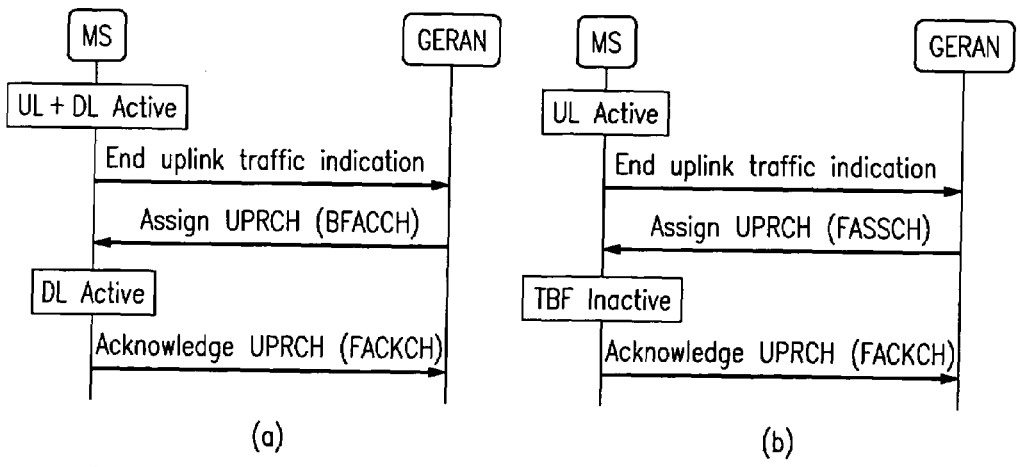
FIG. 12 illustrates the temporary block flow of messages between a mobile station and a base station of a network using GERAN techniques during an end uplink traffic procedure.

As shown in FIG. 12, the network and the MS use the EUT procedure to terminate an uplink traffic flow associated with a TBF.

Start Downlink Traffic (SDT)

Figure 13:
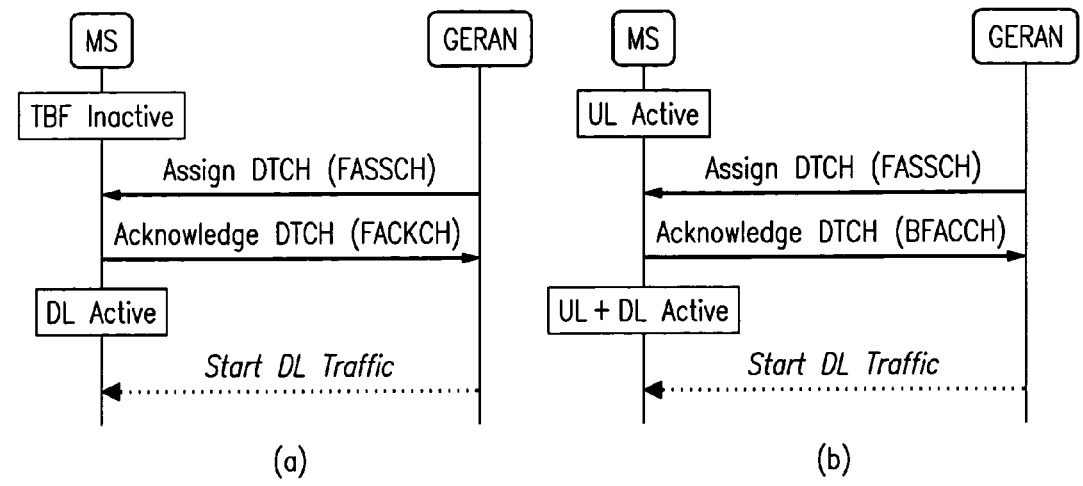
FIG. 13 illustrates the temporary block flow of messages between a mobile station and a base station of a network using GERAN techniques during a start downlink traffic procedure.

As shown in FIG. 13, the network uses the SDT procedure to start a downlink traffic flow associated with a TBF.

End Downlink Traffic (EDT)

Figure 14:
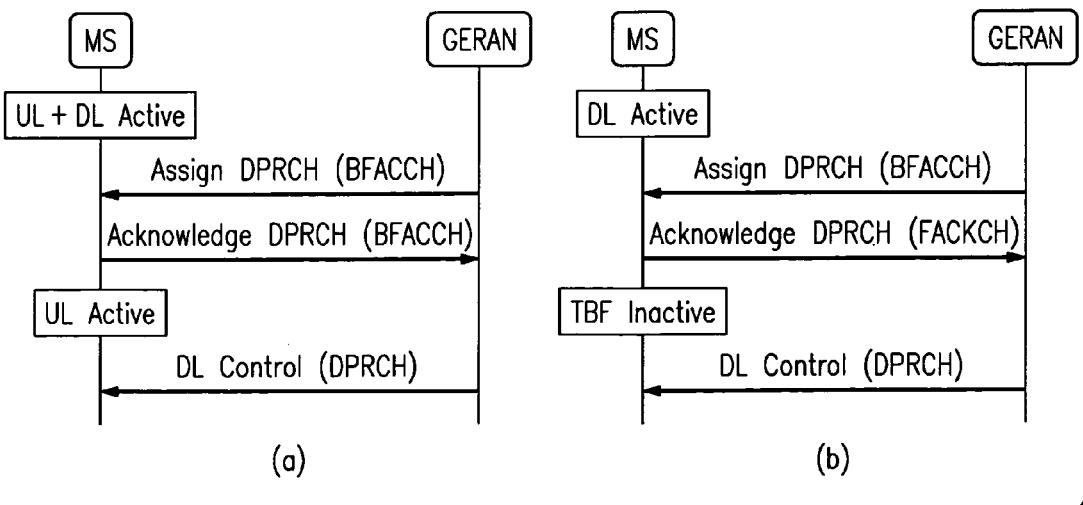
FIG. 14 illustrates the temporary block flow of messages between a mobile station and a base station of a network using GERAN techniques during an end downlink traffic procedure.

As shown in FIG. 14, the network uses the EDT procedure to terminate a downlink traffic flow associated with a TBF.

Performance Results

Burst Error Performance

In order to evaluate uplink and downlink burst error performance, it was assumed that uplink and downlink burst-based messages contain 28 information bits protected by 6 CRC bits. The error correction code selected here is a ⅓-rate convolutional code with constraint length 5. GMSK modulation is assumed and the training sequence consists of 26 bits. It should be mentioned that these assumptions have been used as an indicative example for these simulations only and they do not correspond to the final design of the control messages.

Figure 15:
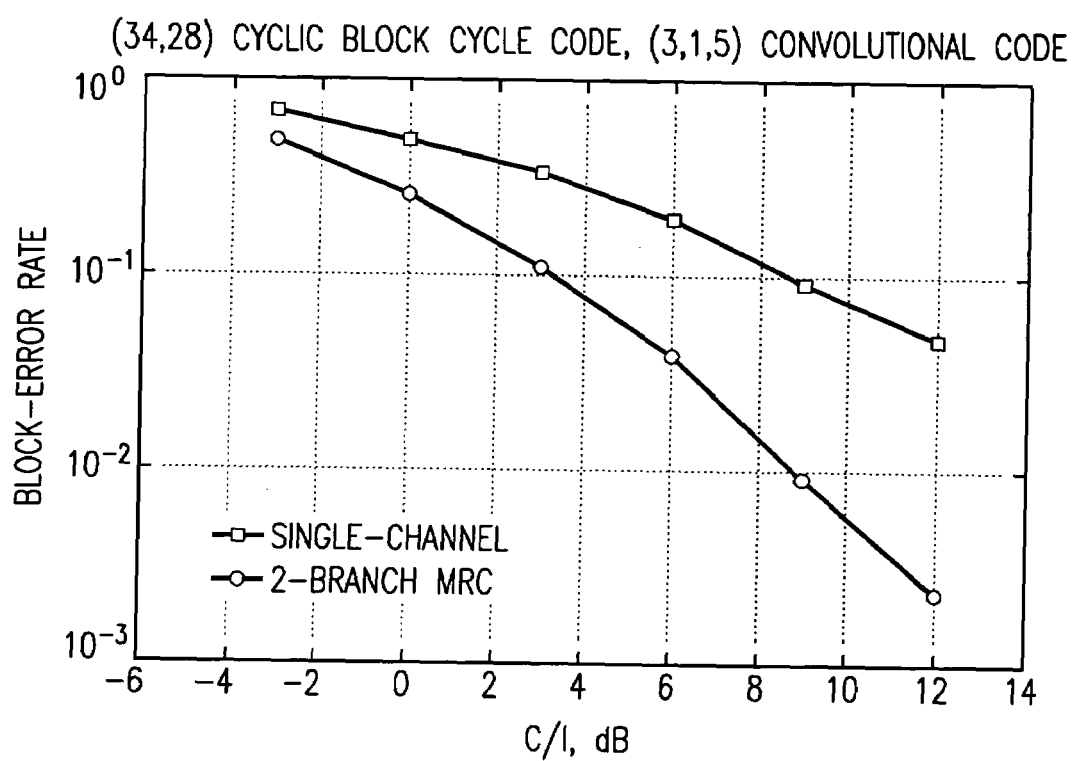
FIG. 15 is a plot of simulated results of link performance of single burst based transmission of communications according to the present invention and to a prior technique.

In FIG. 15 the simulation results on the word error performance of single-burst messages are presented. Two curves are presented, one for a single antenna case (which may be considered to represent the downlink) and one for a two branch antenna case (applicable to the uplink). For C/I=9 dB (which can be considered as a "worst case"), the BLER on the downlink is 0.1 whilst on the uplink it is 0.01. These values were used as inputs to the random access channel simulator.

Performance of the Access and Assignment Method and System

Simulation Model

In this section simulation results on the performance of the technique of the present invention are presented. Voice traffic only is considered. An exponential on-off model has been used for voice activity modeling. The average on period is I sec while the average off period is 1.35 sec, resulting in an average voice activity of 42.5%. As a performance metric, the probability that the access and assignment cycle fails to be completed within 40 msec (Access Failure Probability) was chosen. This time period includes the time it takes for the downlink message to be sent and read by the MS (assignment delay). Both uplink and downlink messages are based on single burst transmission.

The performance of the system heavily depends upon capture effect assumptions. Under moderate load on the random access channel, it may happen that two or more access bursts arrive at the receiving base station simultaneously. In this case it is possible that one (or more than one) of these access bursts is successfully decoded and this is referred to as capture. It is well known that capture improves the performance of ALOHA-based random access schemes. Normally power capture models are considered where several bursts with significantly different power levels arrive at the receiver and the strongest of them captures the receiver. However, capture is possible through improved signal processing even in the case where the received powers are almost the same. These methods are FFS. Here, results for the following scenarios are presented:

No capture

Power capture (at most one message can be recovered).

In the following description, simulation results on the performance of the random access mechanism are presented. Each simulation point corresponds to 10 simulation runs for a fixed number of calls. Each run simulates 15 minutes of actual voice traffic. An exponential backoff algorithm with four states is assumed. Once a talkspurt has been generated an access message is immediately sent in the next available random access burst. In case the MS does not receive an acknowledgement in the next 5 msec, the next random access slot is accessed with probability $a^{-1}$ where a is the base of the backoff algorithm. For these simulations the base of the algorithm is 2 in the case of no capture and 1.2 in the case where capture is taken into account. After a second/third access/assignment failure the access probability is reduced to $a^2$ or $a^{-3}$ respectively. In case more than 3 failures occur, the access probability is not further reduced. The backoff algorithm is a way to avoid protocol instability under heavy load. Alternative stabilization techniques are also possible and are FFS.

Figure 16:
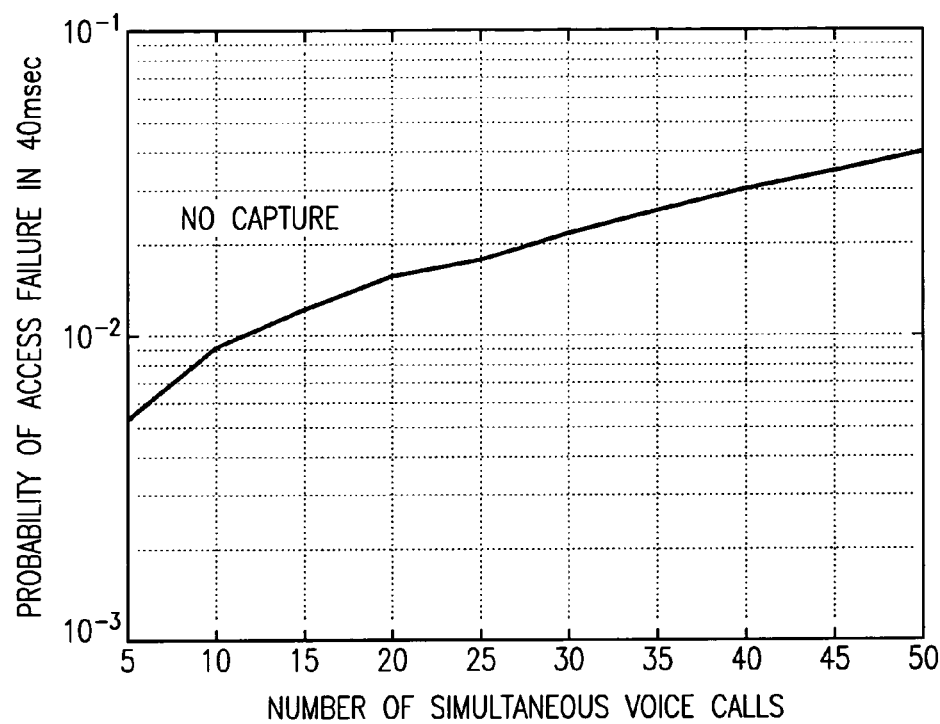
FIG. 16 is a plot of simulated results for the no capture case according to the present invention.
Figure 17:
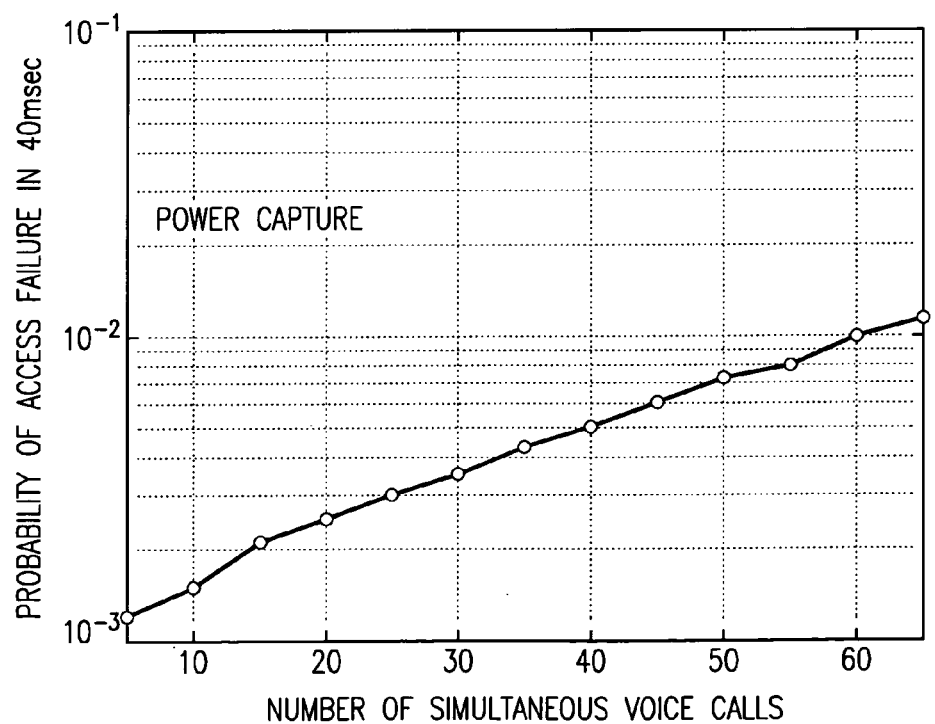
FIG. 17 is a plot of simulated results for the power capture case according to the present invention.

FIG. 16 presents simulation results for the no capture case and it is shown that if the access failure probability is not to exceed a value of $10^{-2}$, then only up to 12 simultaneous calls can be supported. FIG. 17 corresponds to the power capture case and under the same requirement up to 60 calls can be supported without the access failure probability exceeding $10^{-2}$.

Comparison with Block Based Assignment

Also simulated was the performance of an access algorithm, which is based on a 20 msec downlink granularity. According to that technique a MS which needs to send an uplink access message randomly selects 3 out of the 8 available random access bursts in the next 40 msec and "fires" in all of them. The base station collects four uplink access messages (within 20 msec) and responds with a 4-burst interleaved message on the downlink to the successful MS, in the next 20 msec. The main advantage of this technique is the increased robustness of the downlink transmissions due to the increased interleaving depth (as compared to the single burst based downlink transmission).

In these simulations it is assumed that the downlink BLER for CIR=9 dB (TU50, ideal Frequency Hopping) is 0.4% as compared to the 10% value assumed for the single burst transmission. The assumption here is that up to 4 assignment/acknowledgement messages can be transmitted in a 4-burst downlink message. The coding of the individual messages is the same as in the single burst case (6 CRC bits and ⅓-rate convolutional code with 4 tail bits). However, transmission of assignments to multiple mobile stations within a single message is inefficient due to low packing and is incompatible with deployments that use smart antennas and power control. Moreover, with a block based scheme, a 40 ms delay budget can be satisfied only by access attempts in the first 20 ms period. Access attempts in the second 20 ms period are wasted and only increase the load on the access channel. As a result, the performance of this scheme is also studied with a relaxed 60 ms delay budget.

Figure 18:
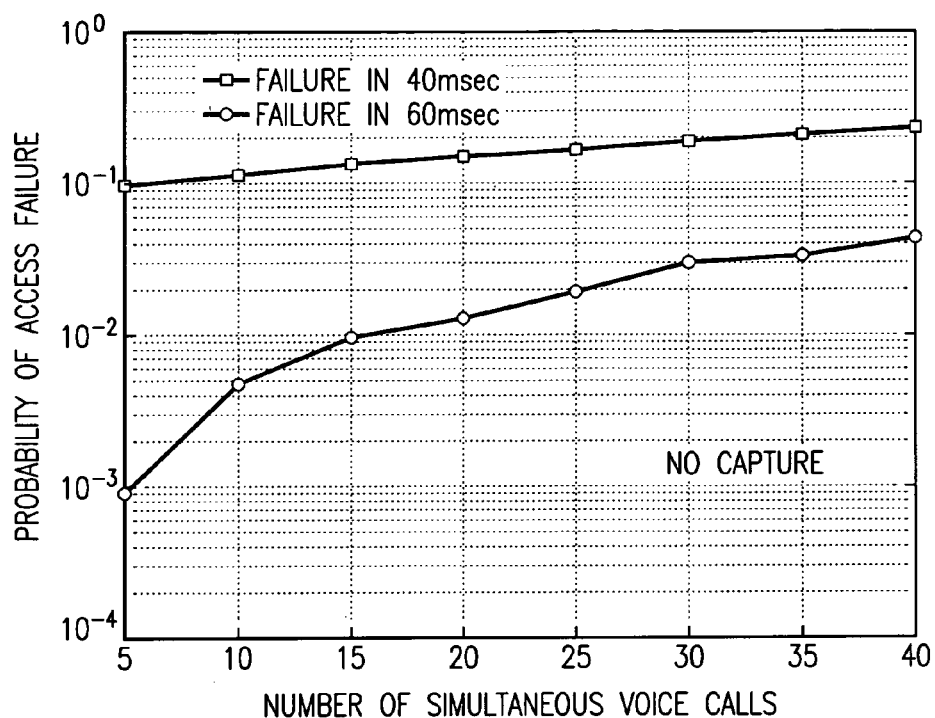
FIG. 18 is a plot of simulated results for the (3,8) algorithm for the no capture case according to the present invention and to a prior technique.
Figure 19:
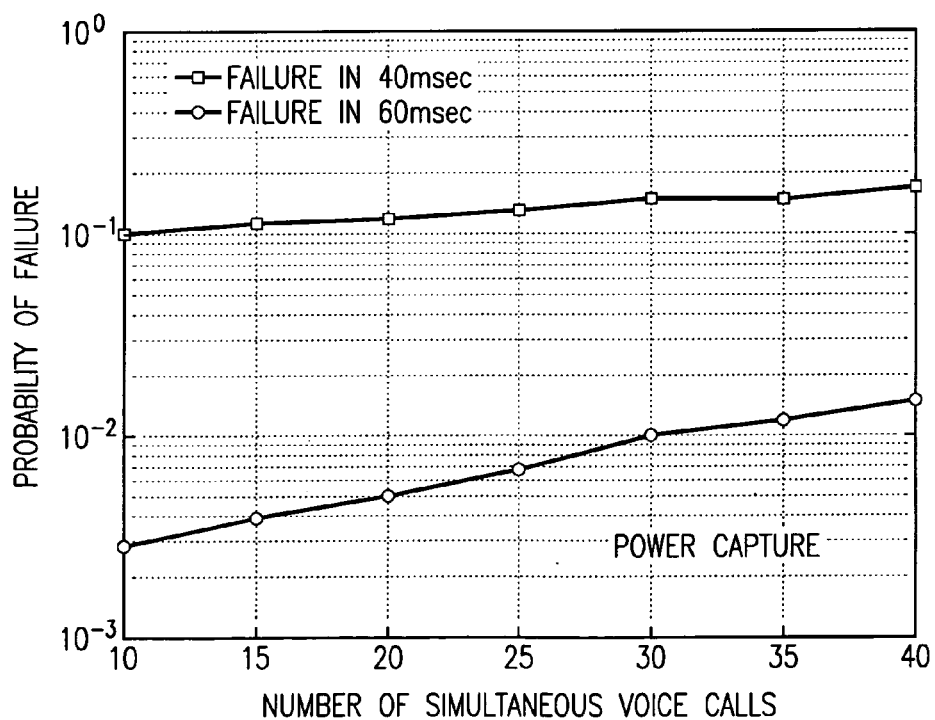
FIG. 19 is a plot of simulated results for the (3,8) algorithm for a power capture case according to the present invention and to a prior technique.

The overall access delay is significantly increased due to the fact that in the best case scenario, the minimum access delay becomes 40 msec (from the moment a talkspurt is generated until the base station successfully acknowledges the receipt of the uplink access message). The performance results for the (3,8) algorithm are illustrated in FIGS. 18 and 19 for no capture and power capture respectively. Two performance indices have been used for this scheme. The first is the probability of access failure within 40 msec (as for the burst based scheme) and the access failure probability within 60 msec. The target value of $10^{-2}$ for the first criterion (40 msec) is not met in any of the cases. By relaxing the criterion to 60 msec, with no capture it is possible to support up to 15 calls and with power capture up to 30 calls on the same random access channel.

By making use of capture techniques according to the present invention, it is possible to support more than 60 simultaneous calls on a single burst based access and assignment channel with a 40 msec delay budget. This corresponds to a successful access rate of 60/2.35=25.5 accesses per second. Schemes based on 20 msec granularity require at least a 60 msec delay budget. Conversational speech cannot afford the additional 20 msec delay. Simulated results have shown that the burst based access and assignment offers a significant performance advantage with a shorter delay budget. Moreover, the burst based access and assignment channels may be deployed efficiently with aggressive reuse, smart antennas and power control, further improving the overhead efficiency.

Figure 20:
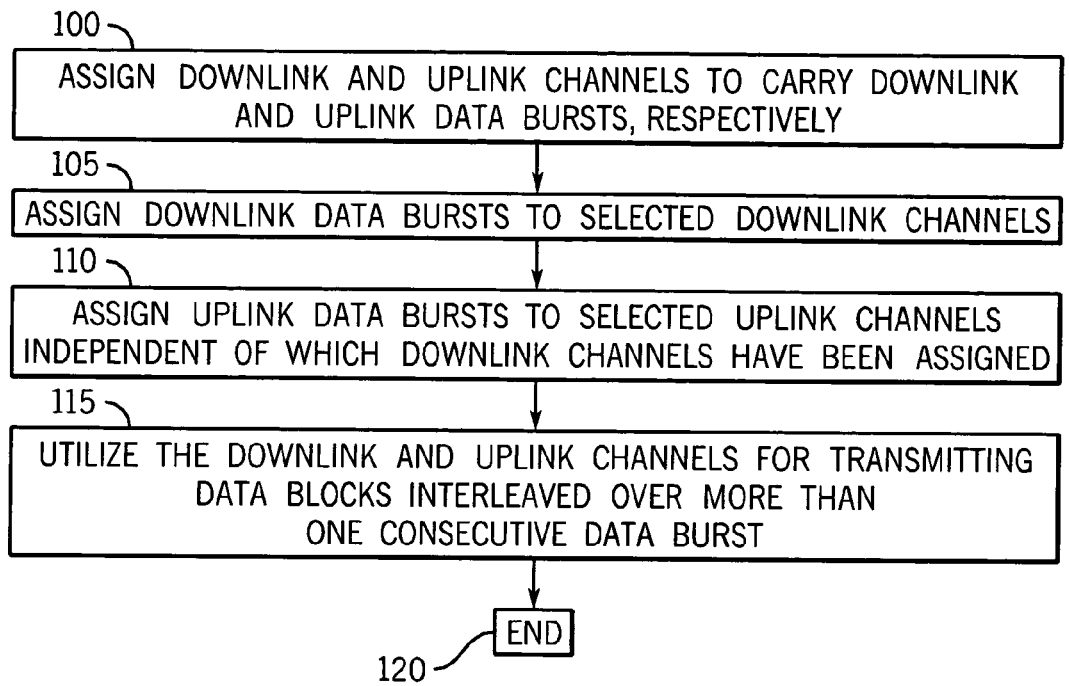
FIG. 20 is a flow diagram of an exemplary method for time division multiplexed communications in accordance with an embodiment of the present invention.

FIG. 20 shows a flow diagram of an exemplary method in accordance with the present invention for communicating over wireless time division multiplexed communications system in which time is divided into a plurality of frames and each frame is divided into N data bursts. In step 100 downlink and uplink channels are assigned to carry downlink and uplink data bursts, respectively. In step 105 downlink data bursts are assigned to selected downlink channels, where the downlink data bursts occur periodically ever N data bursts and occur once per frame. In step 110 uplink data bursts are assigned to selected uplink channels independent of which downlink channels have been assigned. The uplink data bursts occur periodically every N data bursts and occur once per frame. In step 115 the downlink and uplink channels are utilized for transmitting data blocks interleaved over more than one consecutive data burst. This process terminates at End 120.

Figure 21:
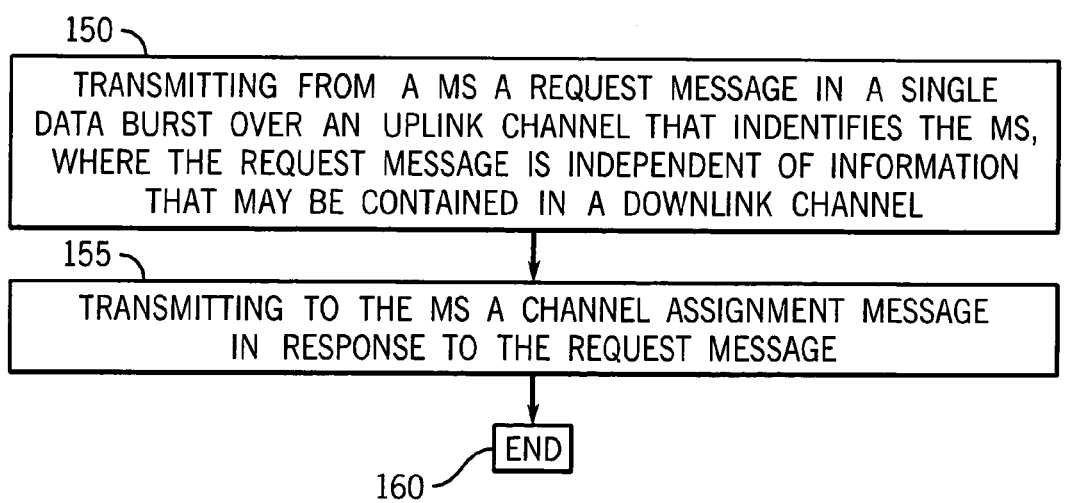
FIG. 21 is a flow diagram of an exemplary method for establishing an uplink channel for communications from a mobile station.

FIG. 21 shows a flow diagram of an exemplary method in accordance with the present invention for establishing an uplink channel for communications from a mobile station. In step 150 a mobile station transmits a request message in a single data burst that identifies the mobile station over an uplink channel. The request message is independent of information that may be contained in a downlink channel. In step 155 a channel assignment message is transmitted to the mobile station in response to the request message. This process terminates at End 160.

Thus, it will now be understood that there has been disclosed a new, advantageous burst based access and assignment method and system for wireless communications. While the invention has been particularly illustrated and described with reference to preferred embodiments thereof, it will be understood by those skilled in the art that changes in form, details and applications may be made therein. It is accordingly intended that the appended claims shall cover all such changes in form, details and applications which do not depart from the true spirit and scope of the invention.

What is claimed is:

1. A method for communicating over a wireless time division multiplexed communications system in which base stations send communications to and receive communications from mobile stations over downlink and uplink channels, respectively, information communicated over the downlink and uplink channels is contained in frames each divided into data bursts, said method comprising the steps of:

acquiring data at the mobile station to be transmitted to the base station where the mobile station has no established uplink channel for transmitting the data to the base station;

transmitting from the mobile station over a first uplink channel a request to establish a data communications uplink channel to the base station;

said request being transmitted independent of any communications being transmitted over any downlink channel, wherein uplink data communications channels can be established without the mobile station having to previously monitor a downlink channel for instructions associated with transmitting the request to establish the uplink channel;

obtaining the assignment of a second uplink channel for transmitting the acquired data; and assigning data bursts that occur periodically every frame to carry the acquired data on the second uplink channel.

2. The method of claim 1 further comprising the steps of:

organizing the acquired data into a first data block;

transmitting the first data block interleaved over more than one consecutive data burst on the second uplink channel.

3. The method of claim 1 wherein the step of transmitting the request identifies the mobile station with a single data burst.

4. The method of claim 1 wherein the step of transmitting the request comprises transmitting the request independent of any information contained in said downlink channels.

5. A method for communicating over a wireless time division multiplexed communications system in which base stations send communications to and receive communications from mobile stations over downlink and uplink channels, respectively, information communicated over the downlink and uplink channels is contained in frames each divided into data bursts, said method comprising the steps of:

acquiring data at the mobile station to be transmitted to the base station where the mobile station has no established uplink channel for transmitting the data to the base station;

transmitting from the mobile station over a first uplink channel a request to establish a data communications uplink channel to the base station;

said request being transmitted independent of any communications being transmitted over any downlink channel;

obtaining the assignment of a second uplink channel for transmitting the acquired data;

organizing the acquired data into a first data block; and transmitting the first data block interleaved over more than one consecutive data burst on the second uplink channel.

6. The method of claim 5 further comprising the steps of assigning data bursts that occur periodically every per frame to carry the acquired data on the second uplink channel.

7. The method of claim 5 wherein the step of transmitting the request identifies the mobile station with a single data burst.

8. The method of claim 5 wherein the step of transmitting the request comprises transmitting the request independent of any information contained in said downlink channels.

* * * * *